United States Patent [19]

Yeh

[11] 4,117,263

[45] Sep. 26, 1978

[54] ANNOUNCEMENT GENERATING ARRANGEMENT UTILIZING DIGITALLY STORED SPEECH REPRESENTATIONS

[75] Inventor: Kou-Min Yeh, Naperville, Ill.

[73] Assignee: Bell Telephone Laboratories, Incorporated, Murray Hill, N.J.

[21] Appl. No.: 852,195

[22] Filed: Nov. 17, 1977

[51] Int. Cl.[2] .......................... G10L 1/08; G06F 7/22

[52] U.S. Cl. .................................. 179/1 SM; 364/200

[58] Field of Search ............. 179/1 SM; 364/200, 900

[56] References Cited

U.S. PATENT DOCUMENTS

| | | | |
|---|---|---|---|
| 3,546,676 | 12/1970 | Ragen | 364/200 |
| 3,662,348 | 5/1972 | Weiss | 340/172.5 |
| 4,031,324 | 6/1977 | Dudonis | 179/6.3 |
| 4,054,756 | 10/1977 | Comella et al. | 179/18 B |
| 4,060,848 | 11/1977 | Hyatt | 364/200 |
| 4,071,888 | 1/1978 | Owens | 364/200 |

*Primary Examiner*—Thomas W. Brown
*Assistant Examiner*—E. S. Kemeny
*Attorney, Agent, or Firm*—Kenneth H. Samples

[57] ABSTRACT

Announcements for each subscriber are assembled specifically for that subscriber from speech segments stored in a digital memory. Each speech segment comprises a predetermined number of consecutive digital words stored in the digital memory and identified by a unique base address. A sequence of speech segment base addresses is placed in a first shift register which is rotated at a fixed rate. An incrementer increments the base addresses read from the shift register by an amount equal to the number of times that the entire base address sequence has been rotated, up to the number of digital words per speech segment. The incremented base addresses are used to access the digital memory. During the rotation of the first shift register, a second shift register is loaded with a second sequence of base addresses. The use of the first and second shift registers is alternated after an entire sequence of base addresses has been read the predetermined number of times so that the output of the digital memory consists of a continuous series of digital words in recurring frames of time-slots where the number of time-slots per frame is equal to the number of base addresses in a shift register. The system also includes a plurality of digital-to-analog speech generators which are uniquely associated with the output time-slots of the speech segment memory.

13 Claims, 2 Drawing Figures

ANNOUNCEMENT GENERATING ARRANGEMENT UTILIZING DIGITALLY STORED SPEECH REPRESENTATIONS

This invention relates to digital announcement generating arrangements and, more specifically, to such arrangements which provide announcements to a plurality of users.

BACKGROUND OF THE INVENTION

Improvements in the field of telephony during the last quarter century have permitted an increasing number of telephone calls to be served on a fully or partially automated basis. These improvements have resulted in better customer service, while at the same time allowing more economical provision of telephone services.

The automation of certain types of telephone services, e.g., coin pay calling, requires the provision of automatically generated announcements. Early announcement generating equipment generally comprised a plurality of magnetic tape read-back units, each of which stored an entire announcement. In order to treat the diverse number of situations which can occur in the course of providing automated special phone services, it is desirable to provide storage not for complete announcements but for individual speech segments which can be selectively combined to make a great number of announcements. Early systems of this type incorporated a number of analog magnetic playback units, each associated with a particular speech segment or word. An announcement was then obtained by switching between these various playback units in order to assemble a completed message. Such analog storage requires a great deal of hardware and is susceptible to faults. More recent systems have adopted techniques which employ the digital storage speech segment information. These systems have generally included a rotating memory, e.g., a disc, on which a plurality of sequential word locations are used to store digital information required to make up a speech segment. A message can be assembled by selectively accessing these segments. The present invention avoids the use of rotating storage device and is thereby physically smaller and less susceptible to mechanical failure.

SUMMARY OF THE INVENTION

In accordance with the present invention, digital data words representing speech segments are stored in a fixed number of consecutive storage locations of a digital random access memory. The first data word of each speech segment is stored at a unique base address. A sequence of speech segment base addresses is placed in a first shift register which is rotated at a fixed rate. As the base addresses rotate representations of them are read and incremented by an amount equal to the number of times that the entire base address sequence has been rotated through its shift register up to the number of digital words per speech segment. The incremented base addresses are used to access the random access memory. During the rotation of the first shift register, a second shift register is loaded with a second sequence of base addresses. The use of the first and the second shift registers is alternated after the entire sequence of base addresses has been read the predetermined number of times so that the output of the digital memory consists of a continuous series of digital words in recurring frames of time-slots where the number of time-slots is equal to the number of base address locations in a given shift register. The invention also includes a plurality of digital-to-analog speech generators, each of which is uniquely associated with one output time-slot of the random access memory.

BRIEF DESCRIPTION OF THE DRAWING

The invention will be more clearly understood by reading the following description in conjunction with the drawing in which.

Figure 1:
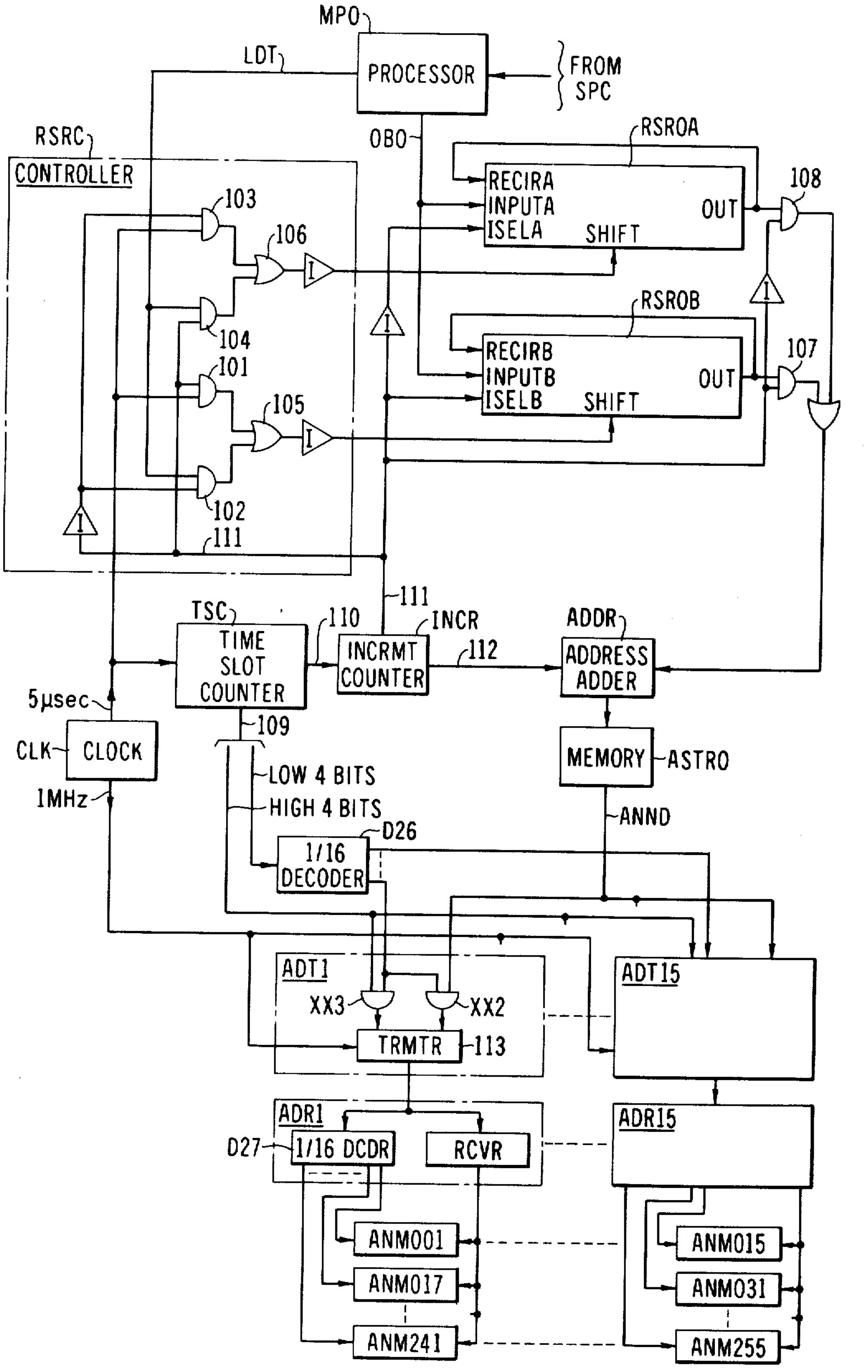
FIG. 1 is a block diagram of an embodiment of the present invention.

A random access memory ASTRO shown in FIG. 1 stores announcement information utilized to generate 512 millisecond speech intervals or segments. The speech segments are selectively applied to up to 240 announcement machines for the transmission of independent announcements to telephone subscribers. The following are some of the 512-millisecond segments in the announcement machine's vocabulary: one, two, three, four, dollars, cents, minute. Longer words or phrases are generated by combining one or more 512-millisecond speech segments. For example, the following are generated by combining two segments: eleven, thirteen, fourteen, fifteen, thank you. From the above examples of the various speech segments available, it is readily apparent how more lengthy words or phrases can be produced.

Each of the 512-millisecond speech segments is comprised of 400 data words, each of which is 40 bits in length, stored in consecutive memory locations in memory ASTRO. Further, the first storage location associated with any given speech segment has a unique base address. The data words for a given segment are retrieved one at a time and applied to the appropriate announcement circuit. Each announcement circuit converts the resulting series of digital words into an analog speech signal 512-milliseconds in length.

Figure 2:
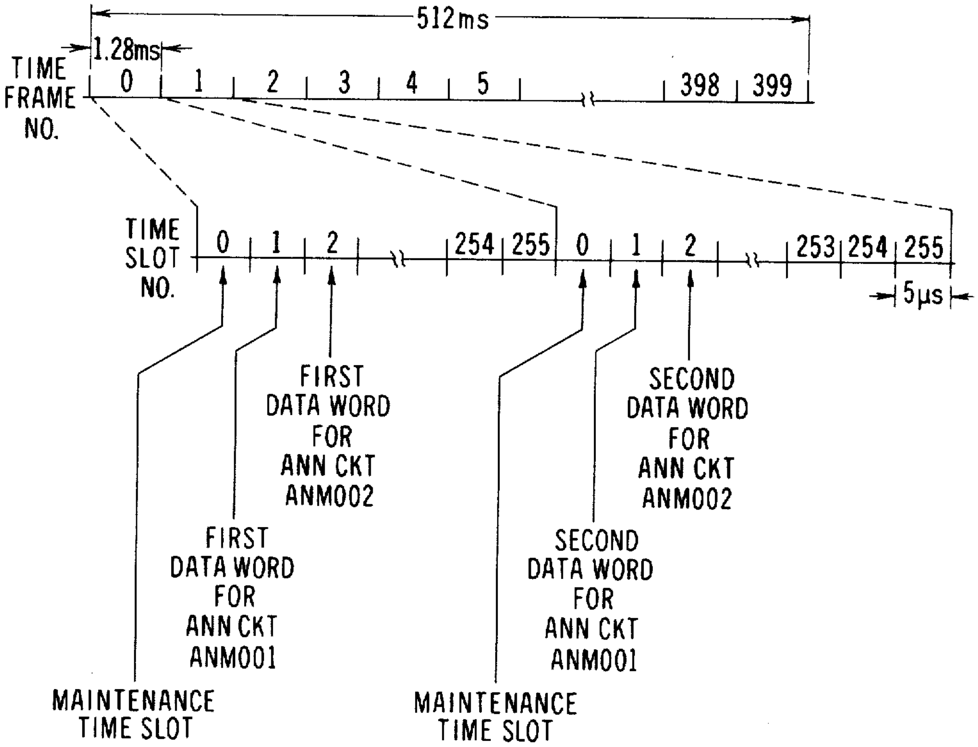
FIG. 2 is a timing diagram, helpful in the understanding of FIG. 1.

FIG. 2 is a timing diagram representing the distribution of the basic time intervals employed in the present embodiment. Memory ASTRO is accessed once every 5 microseconds, resulting in the transmission of a new data word from memory ASTRO once every 5 microseconds. The 5-microsecond period between the transmission of one data word from memory ASTRO and the transmission of the immediately subsequent word from that memory is referred to as a time-slot. Two hundred and fifty-six consecutive time-slots (1.28 milliseconds) comprise a time frame. As previously stated, 240 announcement machines are employed in the present embodiment. Each of these announcement machines is uniquely associated with one of the output time-slots of memory ASTRO. The 16 time-slots not uniquely associated with an announcement circuit can be used for maintenance and error detection purposes. These "maintenance" time-slots in the present embodiment are numbered 0, 16, 32, etc. In FIG. 1 the announcement machines are given numerical designations denoting their associated time-slot. Accordingly, the announcement machines are denoted ANM001 through ANM255 with no announcement machine being numbered for association with the "maintenance" time-slots 0, 16, 32, 48, etc.

The 512-millisecond base period, which is the time duration of each speech segment, comprises 400 time frames of 1.28 millisecond duration. As described in greater detail later herein, speech segments are accessed from memory ASTRO in such a manner that the first data word of all segments is accessed during time frame 0 and the second data word of all speech segments is accessed during time frame 1. Generally stated, during a given time frame, all of the announcement machines ANM001 through ANM255, receive a data word which is the same "relative distance" from the base address associated with the speech segment to be transferred to that announcement machine.

Microprocessor MPO (FIG. 1) in accordance with call processing information transmitted to it from a stored program controller (not shown) determines which speech segments are required for the generation of a given announcement and controls the accessing of memory ASTRO to transmit these speech segments to the corresponding announcement machine. The interaction of the present embodiment with a stored program controller SPC is described in detail in R. M. Dudonis, U.S. Pat. No. 4,031,324 issued June 21, 1977.

The present embodiment includes two shift registers RSROA and RSROB. During each 512-millisecond base period, one of these shift registers, referred to as "active", provides base addresses for accessing data words from memory ASTRO, while the other shift register, referred to as "standby", receives a new list of base addresses from microprocessor MPO for accessing memory ASTRO during the next base period. The active and standby roles of shift registers RSROA and RSROB are reversed each base period under the control of shift register controller RSRC.

The arrangement shown in FIG. 1 further includes a clock circuit CLK which generates a plurality of timing signals. The timing signals are specifically referred to with regard to their use in the present embodiment. One timing signal generated by clock circuit CLK is a repetitive series of pulses spaced 5 microseconds apart, called the 5-microsecond clock pulses. The 5-microsecond clock pulses are applied to a time-slot counter TSC which counts these pulses to determine the passage of time-slots. The 5-microsecond pulses are also applied to the shift register controller RSRC to control the shifting of base addresses through the active shift register. Time-slot counter TSC, in response to the 5-microsecond pulses, generates a recurring sequence of 8-bit binary numbers representing the decimal numbers 0, 1, 2 . . . 255, 0. This sequence of 8-bit binary numbers, called time-slot count, is applied to a bus 109. Further, time-slot counter TSC generates an increment signal on conductor 110 when its count changes from 255 to 0 (every 1.28 milliseconds). This increment signal is applied to an increment counter INCR. Increment counter INCR counts the increment signals from time-slot counter TSC and generates recurring sequence of binary members representing the decimal numbers 0, 1, 2 . . . 399, 0 . . . When increment counter INCR changes its count from 399 to 0, it changes the binary signal on an output conductor 111 (from a logical "0" to a logical "1", or from a logical "1" to a logical "0"). In accordance with the above, the binary state on conductor 111 is changed every 512 milliseconds (1.28 milliseconds $\times$ 400). The signal on conductor 111 is referred to herein as the status signal. The status signal is applied to shift register controller RSRC and is used thereby to alternate the roles of the active and standby shift registers.

The time-slot count generated by the time-slot counter TSC indicates the identity of the current time-slot which is changed every 5 microseconds. The increment signal transmitted from time-slot counter TSC to the increment counter INCR is generated every 256 time-slots or 1.28 milliseconds. Accordingly, this increment signal is generated once per time frame (FIG. 2). In addition to counting the increment signals from time-slot counter TSC the increment counter INCR generates a recurring series of increment codes representing the decimal numbers 0 through 399, which are transmitted via a conductor 112 to an address adder ADDR and used to increment the base addresses in a later-described manner. The value of the increment code is changed every 1.28 milliseconds in response to the increment signal from time-slot counter TSC.

As previously stated, the present system includes two shift registers RSROA and RSROB. Each of these shift registers is comprised of eighteen 1 bit by 256 shift registers, connected in parallel. Each of the 1-bit shift registers can be, for example, the Texas Instrument TMS3114. Each of the shift registers RSROA and RSROB, however, is shown in FIG. 1 as a single shift register which is 18 bits by 256. The shift registers have two information input terminals (a data input and a recirculating input), one output terminal, and two control inputs (shift and input select). The output terminal is connected to the last or output storage position of the shift register. A given shift register in response to a logical "0" input at its input select terminal ISEL will write data received at its input data terminal INPUT to the exclusion of any information present on the terminal RECIR. The input data is written into the first or input storage position which is the most distant storage position from the output storage position. Conversely, a logical "1" input to the terminal ISEL results in the storage of information on the input terminal RECIR to the exclusion of data applied to the input terminal. In the present example, the output terminal of each shift register is connected to the RECIR terminal so that a logical "1" at terminal ISEL results in the signal at the output of the shift register being written back into the input of that shift register. In this manner, the data words stored by the shift register can be made to circulate.

In the present example, microprocessor MPO generates base addresses which are to be used to access memory ASTRO. The generation of such base addresses and the interaction of the present embodiment with telephone subscribers is described in the afore-mentioned R. M. Dudonis patent. When microprocessor MPO desires to write a base address into a shift register, it transmits the base address on an output bus OBO which bus is connected to the data input terminal of both shift registers RSROA and RSROB. Each transmission of a base address from microprocessor MPO is accompanied by the transmission of a load pulse to the shift register controller RSRC on conductor LDT. As previously stated, shift register controller RSRC also receives the series of 5-microsecond pulses from clock circuit CLK. It is the function of shift register controller RSRC to apply the 5-microsecond pulses to the active shift register, causing it to recirculate at a rate equal to 5 microseconds per base address and to apply each load pulse to the standby shift register to cause it to receive and store incoming base addresses from microprocessor MPO.

Shift register controller RSRC comprises four AND gates 101 through 104. These AND gates are controlled by status signals from increment counter INCR on conductor 111. When a logical "1" status signal is applied to shift register controller RSRC by increment counter INCR, shift register RSROB receives the 5-microsecond shift pulses via AND gate 101 and an OR gate 105, while shift register RSROA receives the load pulses from microprocessor MPO via AND gate 104 and an OR gate 106. Conversely, when a logical "0" status signal is received from increment counter INCR, the 5-microsecond shift pulses are applied to shift register RSROA via AND gate 103 and OR gate 106, while shift register RSROB receives the load pulses from microprocessor MPO via AND gate 102 and OR gate 105. The status signal from increment counter INCR is applied via conductor 111 directly to terminal ISELB of RSROB and to an AND gate 107. The other input of AND gate 107 is connected to the output terminal of shift register RSROB. The status signal on conductor 111 is also inverted and applied to input terminal ISELA of shift register RSROA and applied via an inverter to an AND gate 108, which is also connected to the output of shift register RSROA.

The following is an example of the operation and control of shift registers RSROA and RSROB as used to generate addresses for memory ASTRO. In this example, it is assumed, as initial conditions, that the announcement system is in time-slot 0 of time frame 0 during a base period where shift register RSROA is active and shift register RSROB is standby. Accordingly, the following signals are present on the following conductors:

| Conductor | Signal | Signal Function |
|---|---|---|
| 109 | 0 | Time-slot count |
| 110 | no pulse | Increment signal |
| 111 | 0 | Status signal |
| 112 | 0 | Increment code |

In this mode, the base address in shift register RSROA associated with time-slot 0 is in the output storage position and is accordingly applied to address adder ADDR. It will be remembered that information in the output storage position is also returned to input terminal RECIR. Adder ADDR adds this base address to the increment code (time frame number) 0 from conductor 112. The result of this addition is used to access memory ASTRO.

The next 5-microsecond clock pulse from clock circuit CLK increases the time-slot count on conductor 109 to "1" and, via AND gate 103 and OR gate 106, rotates the shift register RSROA one position toward the output storage position. Also, in the manner previously described, the contents of the output storage position are written into the input storage position. The shift of shift register RSROA one position applies the base address associated with time-slot 1 to the address adder ADDR. The time frame number 0 is added thereto and the result is used to to access memory ASTRO. This process of rotating one base address toward the output each 5 microseconds and the addition of 0 to each base address continues until time-slot counter TSC changes its count from 255 to 0. At the change from 255 to 0, an increment pulse transmitted from time-slot counter TSC to increment counter INCR via conductor 110. Increment counter INCR responds to this pulse by increasing the time frame number by one to indicate time frame number 1. Shift register RSROA continues to be rotated as before except now an increment code of one is added to each base address applied to the address ADDR. Each time the increment counter INCR receives a pulse from time-slot counter TSC, the increment code to be added to the base addresses is incremented by one until the time frame number equals 399. At the next increment pulse from time-slot counter TSC, the increment code is reset to 0 and the status signal from increment counter INCR on conductor 111 is changed from a logical "0" to a logical "1", making RSROB the active shift register and RSROA the standby shift register. The entire process continues as above described except that the base addresses stored in shift register RSROB are now rotated and added to the increment code (time frame numbers) and used to access memory ASTRO.

Microprocessor MPO loads new base addresses into the standby shift register while the active shift register is rotating as above described. In accordance with the present example, shift register RSROA is now the standby shift register as indicated by the logical "1" status signal on conductor 111. Microprocessor MPO transmits the base addresses to the shift registers in sequence, starting with the base address to be associated with time-slot 0. The times at which microprocessor MPO transmits each address to the shift registers is not critical since each will be written into the standby shift register when the load pulse on conductor LDT is received by the shift register. Accordingly, microprocessor MPO may interleave the transmission of base addresses with other work which it has to perform. The base addresses must, however, be transmitted in sequence starting with the base address to be associated with time-slot 0 and all 256 base addresses must be transmitted to the standby shift register within one 512-millisecond base period.

To load the standby shift register (RSROA in the present example) microprocessor MPO transmits the base address to be associated with time-slot 0 on conductor OBO. While this base address is still on conductor OBO, microprocessor MPO transmits a load pulse to controller RSRC via conductor LDT. This load pulse is applied to the shift input of shift register RSROA via AND gate 104 and OR gate 106. It should be mentioned that the microprocessor MPO does not need to "know" which of the shift registers is active and which is standby. Shift register controller RSRC will always gate the load pulse to the standby shift register. After the transmission of the first base address, microprocessor MPO transmits the base address to be associated with time-slot 1, accompanied by a load pulse on conductor LDT. This load pulse shifts the base address to be associated with time-slot 0, one position toward the output and loads the base address on conductor OBO into the input storage area of shift register RSROA. This process continues until 256 base addresses have been transmitted to shift register RSROA, in sequence. After all base addresses have been transmitted to the standby shift register, the base address to be associated with time-slot 0 resides in the output storage location of the shift register and the remaining base addresses are stored in a sequence determined by their associated time-slots.

The memory addresses generated at 5-microsecond intervals as above described are applied in sequence to the memory ASTRO. In response thereto, the memory ASTRO retrieves the data words stored at these addresses and applies them in sequence to an output bus ANND. Accordingly, the output of memory ASTRO on bus ANND is a series of data words each occupying a distinct 5-microsecond time-slot. It will be remembered that each time-slot is uniquely associated with one of the announcement machines ANM001 through ANM255 and that each time-slot is identified by the time-slot count on conductor 109. The data words transmitted on bus ANND are applied in common to 15 announcement data transmitters ADT1 through ADT15. The least significant 4 bits of the time-slot designations from time-slot counter TSC are applied to a 1-out-of-16 decoder D26. In response to these 4 bits, decoder D26 generates a logical "1" on one of its 16 output conductors. Fifteen of the sixteen output conductors are individually associated with one of fifteen announcement data transmitters ADT1 through ADT15. The sixteenth possible output conductor from decoder D26 is associated with only maintenance time slots and is not connected in the present embodiment.

The logical "1" generated by decoder D26 during each nonmaintenance time-slot is applied to AND gate XX3 and XX2 of the corresponding announcement data transmitter. This logical "1" from decoder D26 enables gate XX2 to transmit the data word present on bus ANND to a data transmitting circuit 113. Additionally, the logical "1" applied to AND gate XX3 from decoder D26 enables AND gate XX3 to transmit the most significant 4 bits of the time-slot designation on conductor 109 to the data transmission circuit 113. Data transmission circuit 113 in response to 1 megahertz clock pulses from clock circuit CLK serially transmits the information gated to data transmission circuit to an announcement data receiver associated therewith. Fifteen announcement data receivers are included in the present embodiment, each being uniquely associated with one of the announcement data transmitting circuits ADT1 through ADT15. The announcement data receiver, e.g., ADR1, which receives a data word from announcement data transmitter, e.g., ADT1, separates the most significant 4 bits of the time-slot designation code from the information received and applies these bits to a 1-out-of-16 decoder D27. In response to these most significant 4 bits, decoder D27 generates a logical "1" on one of its 16 output conductors. Each of the output conductors of decoder D27 is uniquely associated with one of the announcement machines ANM001 through ANM241 (counting by 16s). The logical "1" from decoder D27 enables the selected announcement machine to receive the data word from announcement data receiver ADR1 and apply it as an announcement to the customer associated with that announcement machine.

Time-slots are allocated to the announcement circuits such that they are served in a sequence indicated by the numerical designations given them in FIG. 1. This operates to distribute the use of any given data transmitter and receiver pair, e.g., ADT1 and ADR1, to once every 16 time-slots.

The examples given above describe an announcement generating system having 256 time-slots for the distribution of speech segments, each segment comprising 400 digital data words. The principles of the present invention, however, include systems having other numbers of time-slots and other numbers of data words per speech segment. For example, a system having *n* time-slots and *m* data words per speech segment will function in accordance with the principles of the present invention. In this example, the shift registers RSROA and RSROB each contain *n* storage locations for base addresses. Further, time-slot counter TSC resets and generates an increment signal on conductor 110 when it counts to a value indicating *n* time-slots. Also, the increment counter counts *m* such increment signals before changing the status signals it applies to conductor 111.

What is claimed is:

1. An announcement generating system comprising:

memory means for storing a plurality of digital representations of speech segments wherein each speech segment representation comprises a number of data words equal to a predetermined number stored in consecutive storage locations of said memory means and the first storage location of each speech segment representation is a unique base address;

a first base address storage means for storing a plurality of base addresses in a fixed sequence;

a second base address storage means for storing a plurality of base addresses in a fixed sequence;

means for generating first and second status signals defining the first and second base address storage means respectively to be active;

reading means responsive to said status signals for reading the entire sequence of base addresses from the active base address storage means a number of times equal to said predetermined number;

means for generating incremented base addresses by incrementing each base address read by said reading means by an amount equal to the number of times its entire associated base address sequence has been read; and means for accessing data words from said memory means at the addresses defined by said incremented base addresses.

2. The combination in accordance with claim 1 wherein said means for generating first and second status signals changes the status signals after the entire base address sequence stored by the active base address storage means has been read a number of times equal to said predetermined number, to define the other base address storage means as active.

3. The combination in accordance with claim 2 further comprising:

a base address source for generating base addresses;

means responsive to said status signals for writing base addresses from said generating means into the one of said base address storage means which is not defined as active by said status signals.

4. The combination in accordance with claim 3 further comprising:

a plurality of announcement generating machines for converting said data words into analog representations of speech wherein each announcement machine is uniquely associated with one of the base addresses stored in the active one of said base address storage means; and means for transmitting data words accessed from said memory means in response to a given incremented base address to the announcement machine associated with the base address utilized to form that given incremented base address.

5. An announcement generating system comprising:

a timing signal generator for generating timing signals defining time-slots of fixed duration;

memory means for storing a plurality of digital representations of speech segments wherein each speech segment representation comprises a number of data words equal to a first predetermined number stored in consecutive storage locations of said memory means and the first storage location of each speech segment representation is a unique base address;

first base address storage means for storing a number of base addresses equal to a second predetermined number of base addresses in a fixed sequence;

means responsive to said timing signals for reading said base addresses in sequence at a rate equal to one base address per time-slot;

counting means responsive to said timing signals for counting said time-slots and for generating a recurring series of time-slot count signals from 0 through said second predetermined number;

means responsive to said time-slot count signals for generating an increment signal when said time-slot numbers change from said second predetermined number to zero;

means responsive to said increment signal for generating an increment code equal to the number of increment signals generated;

means for generating incremented base addresses by adding each base address read by said reading means to said increment code;

means for accessing data words from said memory means at the addresses defined by said incremented base addresses;

a plurality of announcement generators each associated with a unique one of said time-slots; and means responsive to said time-slot count signals for transmitting data words read from said memory means to the announcement generator associated therewith.

6. The combination in accordance with claim 5 further comprising second base address storage means for storing said second predetermined number of base addresses in a fixed sequence; and status signal generating means for generating status signals defining one of said base address storage means to be active and the other to be standby, said status signal generating means being responsive to an increment code equal to said first predetermined number for alternating the active standby states of said first and second base address storage means.

7. The combination in accordance with claim 6 further comprising:

a base address source for generating base addresses; and means responsive to said status signals for writing base addresses from said base address generating means into the one of said base address storage means defined as standby by said status signals.

8. An announcement generating system comprising:

a clock pulse generator for generating a series of equally spaced clock pulses defining time-slots of fixed duration;

memory means for storing a plurality of digital representations of speech segments wherein each speech segment representation comprises *m* data words stored in consecutive storage locations of said memory means and the first storage location of each speech segment representation is a unique base address;

a first shift register for storing *n* base addresses in a fixed sequence;

a second shift register for storing *n* base addresses in a fixed sequence;

means for generating first and second status signals defining the first and second shift registers, respectively, to be active;

reading means responsive to said status signals for reading the entire sequence of base addresses from the active shift register *m* times, said reading means being responsive to said clock pulses to read base addresses from said active shift register at the rate of one base address per time slot;

means for generating incremented base addresses by incrementing each base address read by said reading means by an amount equal to the number of times its entire associated base address has been read; and means for accessing data words from said memory means at the addresses defined by said incremented base addresses.

9. The combination in accordance with claim 8 wherein said means for generating first and second status signals includes means for changing the status signals after the base address sequence stored by the active shift register has been read *m* times to define the other shift register as active.

10. The combination in accordance with claim 9 further comprising:

a base address source for generating base addresses; and means responsive to said status signals for writing base addresses from said generating means into the one of said shift registers which is not defined as active by said status signals.

11. The combination in accordance with claim 10 wherein said base address source generates a load pulse associated with each base address generated thereby and wherein said means responsive to status signals for writing base addresses is further responsive to said load pulses to write said base addresses into the shift register not defined as active by the status signals.

12. The combination in accordance with claim 11 further comprising a plurality of announcement generating machines for converting said data words into analog representations of speech wherein each announcement machine is uniquely associated with one of said time-slots of fixed duration; and means responsive to said clock pulses for transmitting data words accessed from said memory means during a given time-slot to the announcement machine associated with that time slot.

13. An announcement generating system comprising:

a memory storing digital representations of speech segments wherein each speech segment comprises a number of data words equal to a predetermined number stored in consecutive storage locations;

a first base address storage means for storing a sequence of base addresses each defining the first storage location associated with the sequence of data words comprising one of said speech segments;

a second base address storage means for storing a sequence of base addresses, each defining the first storage location of the sequence of data words comprising one of said speech segments;

first reading means for sequentially reading the entire sequence of base addresses stored in said first base address storage means a number of times equal to said predetermined number;

second reading means for sequentially reading the entire sequence of base addresses stored in said second base address storage means a number of times equal to said predetermined number;

control means for alternately activating said first and second reading means;

means for incrementing each base address read from either of said base address storage means by an amount equal to the number of times the base address sequence including that base address has been read; and means for accessing said memory at the addresses defined by said incremented base addresses.

* * * * *